United States Patent
Benson

(10) Patent No.: US 6,252,764 B1
(45) Date of Patent: Jun. 26, 2001

(54) PORTABLE, TEMPORARY POWER HOOKUP FOR USE AT CONSTRUCTION SITES AND METHODS

(76) Inventor: Robert Karl Benson, 997 N. 350 East, Orem, UT (US) 84057

( * ) Notice: Subject to any disclaimer, the term of this patent is extended or adjusted under 35 U.S.C. 154(b) by 0 days.

(21) Appl. No.: 09/460,046

(22) Filed: Dec. 13, 1999

(51) Int. Cl.[7] ............................................... H01B 7/06
(52) U.S. Cl. .................. 361/625; 361/601; 361/641; 361/659; 361/668; 174/37; 174/69; 248/129
(58) Field of Search .................. 361/601–603, 361/611–631, 634, 641, 643, 652, 663, 672, 658–660; 174/37–38, 52.1, 45 R, 69; 307/112, 147, 113, 47, 150; 200/51 R; 324/110, 156; 434/365, 379; 248/129, 27.1

(56) References Cited

U.S. PATENT DOCUMENTS

| | | | |
|---|---|---|---|
| 3,158,679 | * 11/1964 | Ware | 174/1 |
| 3,631,324 | * 12/1971 | Jones | 317/99 |
| 4,717,108 | 1/1988 | Liedle . | |
| 4,888,448 | 12/1989 | Moerman . | |
| 5,400,212 | 3/1995 | Hanson . | |
| 5,404,266 | 4/1995 | Orchard et al. . | |
| 5,418,683 | 5/1995 | Orchard et al. . | |
| 5,544,003 | * 8/1996 | Vaughan | 361/625 |
| 5,574,622 | * 11/1996 | Brown | 361/625 |
| 5,726,507 | 3/1998 | Tipton . | |
| 5,838,078 | 11/1998 | Tipton . | |
| 5,973,264 | * 10/1999 | O'Connor | 174/69 |

* cited by examiner

*Primary Examiner*—Leo P. Picard
*Assistant Examiner*—Michael Datskovsky
(74) *Attorney, Agent, or Firm*—TraskBritt

(57) ABSTRACT

An apparatus for providing temporary electrical service. The apparatus includes a support structure having at least one service line, a meter base, and a breaker box secured thereto. One or more electrical receptacles can also be secured to the support structure. The support structure can be a trailer so as to facilitate the ready transport of the apparatus. The apparatus can also include a temporary service pole securable to the support structure, with a first service line for connecting to an overhead power supply extending through the service pole to a transfer switch. A second service line that can be connected to an underground power supply also connects to the transfer switch. The transfer switch can be positioned to permit electricity to flow from one of the service lines into the meter base, then into the breaker box. From the breaker box, electricity can flow into the electrical receptacles to facilitate the use of electrical equipment. Methods of using the apparatus are also disclosed.

23 Claims, 8 Drawing Sheets

PORTABLE, TEMPORARY POWER HOOKUP FOR USE AT CONSTRUCTION SITES AND METHODS

BACKGROUND OF THE INVENTION

1. Field of the Invention

The present invention relates generally to apparatus that are used to provide temporary electrical power to construction sites. Particularly, the present invention relates to a portable apparatus for providing temporary electrical power to a construction site. The present invention also relates to methods of providing temporary electrical power to construction sites by using the apparatus.

2. State of the Art

A temporary source of electricity is typically needed at a construction site to power electrical tools, lighting, and other equipment that may be used at the construction site. Temporary power is often provided to a construction site by way of a temporary connection to either an overhead or underground power supply.

When electricity is provided to a construction site by way of a temporary connection to an overhead power supply, an electrician typically has to dig a hole and set a cumbersome temporary service pole close to a transformer associated with the overhead power lines. Digging the hole and securing, or setting, the temporary service pole therein is often a labor-intensive, time-consuming task, as the hole must be deep enough to secure the typically tall, temporary service pole for the entire duration of construction at the site.

Typically, a temporary service pole has a conduit along at least a portion of the length thereof Service wires extend from the top of the temporary service pole, through the conduit, to a location along the length of the temporary service pole where a meter base, which measures the amount of electricity used at the construction site, is to be secured. Thus, the conduit of the temporary service pole encloses the electrical wires to protect and prevent tampering with the service line.

The electrician connects the ends of the wires of the service line that are exposed along the length of the temporary service pole to a meter base. The meter base is electrically connected to a breaker box to which one or two electrical receptacles that are protected by a ground fault circuit interrupter (GFCI) are typically electrically connected. The meter base, breaker box, and conduits are then secured to the temporary service pole. Once the temporary service pole is in place, the local inspection authority will inspect the pole and the wiring between each of the foregoing components. The power company then connects the other end of the wires of the temporary service line to the nearby overhead power supply.

A temporary hookup can be made to underground power lines in a similar manner. If a temporary service pole is used to provide power to a construction site from an underground power supply, however, the wires of the service line extend through the pole to a location proximate the bottom end thereof to facilitate connection with the underground power lines. Alternatively, as long as the service line is somehow enclosed and protected, the service pole can be omitted and the temporary service line connected directly to a stable, stationary meter base.

Since it typically takes several months to complete the construction of a structure, electricians typically include the costs of temporary electrical service components in their fee for setting up the temporary electrical connection. Moreover, the components of a temporary electrical connection, including the service line, the meter base, and the breaker box, can be exposed to a variety of weather conditions, as well as construction conditions that may damage these temporary electrical service components. If the components of the temporary electrical connection are to be reused, once construction has been completed, the components must be disassembled from one another and the temporary service pole removed from the ground. These components, including the cumbersome temporary service pole, are then typically loaded onto or in a trailer and transported to another construction site or stored for later use. Electricians sometimes abandon the components of a temporary electrical connection.

Accordingly, there is a need for an apparatus by which temporary electrical service can be provided without requiring an electrician to dig a hole, to set a temporary service pole in the hole, to electrically connect a meter base to one end of a service line, and to electrically connect a breaker box to the meter base. There are also needs for an apparatus that enables an electrician to reuse the components of a temporary electrical connection without removing a temporary service pole from the ground or requiring the disassembly of each of the components, for a temporary electrical service apparatus that can be more easily moved from one construction site to another, and for an apparatus that can be used, without significant modification, to provide temporary electrical service from either overhead or underground power lines.

SUMMARY OF THE INVENTION

The present invention includes an apparatus for providing temporary electrical service, for example, at a construction site. The apparatus of the invention includes a support structure having an enclosed service line, a meter base, a breaker box, and electrical receptacles. The service line is prewired to the meter base, which is prewired to the breaker box. Electrical receptacles that are protected by a ground fault circuit interrupter (GFCI) are electrically connected to the breaker box.

According to a first aspect of the invention, the apparatus has a portable support structure, such as the bed of a trailer. Thus, the apparatus has wheels to facilitate the ready transport thereof from one construction site to another construction site or to a storage location. A portion of the service line extends through an enclosure of the support structure, such as a conduit through or secured to the trailer. One end of the service line is exposed for connection to a power supply. The other, enclosed end of the service line communicates electrically with the meter base, which is secured to the trailer. The meter base, in turn, communicates electrically with the breaker box, which is also secured to the trailer. In addition, electrical receptacles can be secured to the trailer.

In another aspect of the present invention, the apparatus can be used to provide temporary electrical service from either an overhead power supply or an underground power supply.

Such an apparatus has secured to the support structure a service pole configured to facilitate the connection of a first service line to an overhead power supply. Preferably, the service pole is pivotally secured to the support structure so as to be movable between a lowered, transport position and an upwardly extending electrical service position. Preferably, the service pole can be secured in the electrical service position. An end of a first line is exposed proximate a top end of the service pole to facilitate connection of the first service line to an overhead power supply. The first service line extends through and is enclosed within the service pole and through an enclosure of the support structure to a transfer switch secured to the support structure.

The apparatus also includes a second service line. A first end of the second service line is configured to be connected with an underground power supply. The second service line extends through an enclosure of or is carried by the support structure to the transfer switch.

The transfer switch has three positions: a first position that permits the transfer of electricity from the first service line therethrough; a second position that permits electricity from the second service line to flow therethrough; and a third position in which both service lines are open and no electricity passes through the transfer switch. Depending upon the position of the transfer switch, electricity from one of the first and second service lines may flow to the meter base through a transfer line connected between the transfer switch and the meter base. Electricity then flows to the breaker box, which is connected to the meter base, and can be used by way of receptacles that are in electrical communication with the breaker box. Moreover, as the first and second service lines are connected to the transfer switch in such a manner that electricity from only one of the service lines flows through the switch, the first and second service lines remain electrically isolated from each other. Therefore, when one of the first and second transfer lines is connected to a power supply, electricity will not flow to the exposed end of the other transfer line (i.e., the exposed end of the other transfer line will not be live).

The present invention also includes methods using the apparatus to provide temporary electrical service from either an overhead power supply or an underground power supply, as well as methods for disconnecting the apparatus from a power supply and transporting the apparatus to another location for reuse or storage.

Other features and advantages of the present invention will become apparent to those in the art through consideration of the ensuing description, the accompanying drawings, and the appended claims.

DETAILED DESCRIPTION OF THE PREFERRED EMBODIMENTS

Figure 1:
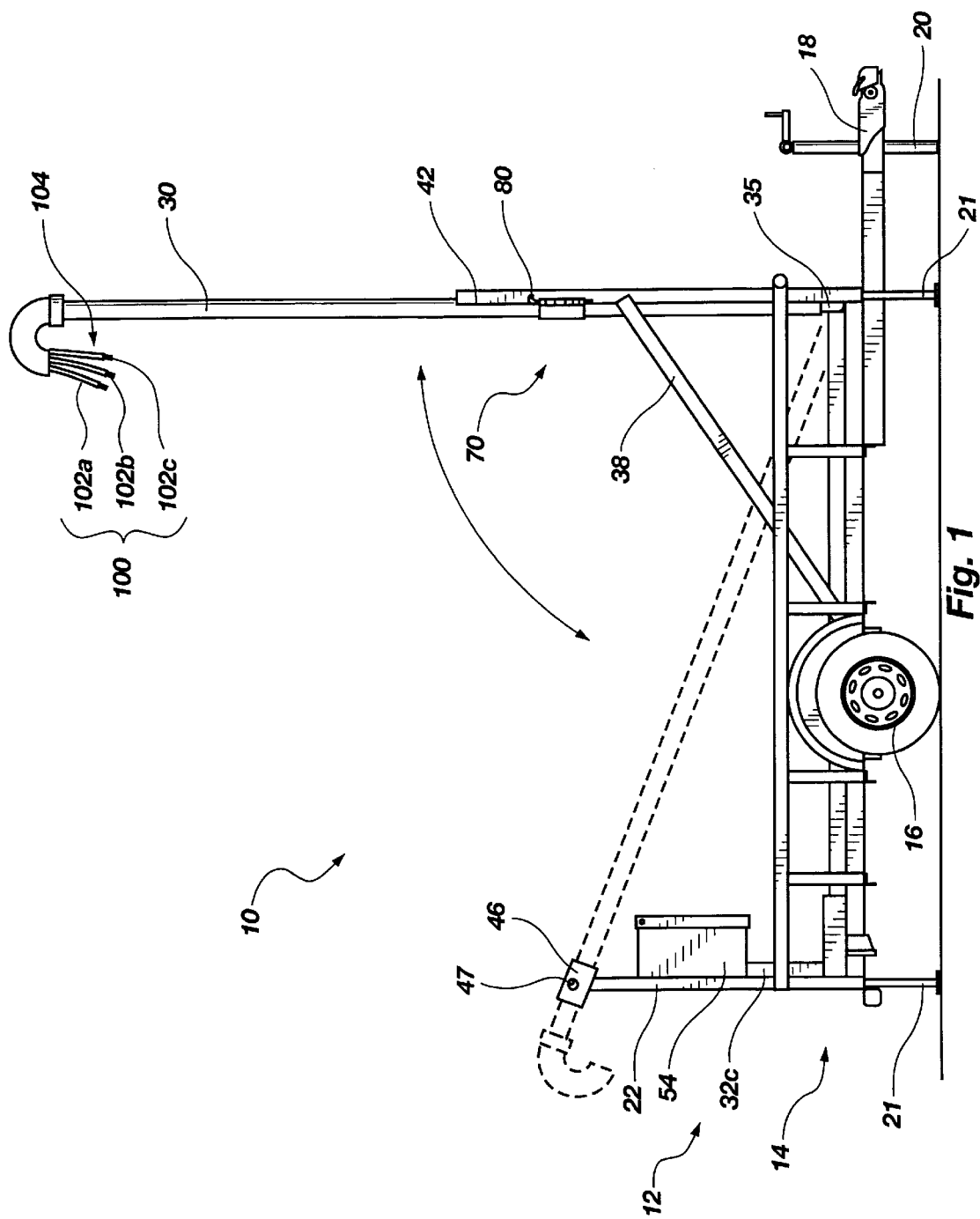
FIG. 1 is a side view of an apparatus according to the present invention for providing temporary electrical service.

FIGS. 1–4 illustrate an apparatus 10 according to the present invention, which can provide temporary electrical service, for example, to a construction site. As shown in FIG. 1, apparatus 10 includes a trailer 12 with a bed 14, wheels 16 secured at sides of bed 14, a trailer hitch 18 extending from the front of bed 14, and a trailer support 20 secured to trailer hitch 18 and downwardly extendable therefrom. Wheels 16 and trailer hitch 18 facilitate the transportation of apparatus 10 and, thus, of all of the electrical componentry secured to bed 14. Trailer support 20 is configured to support bed 14 in a substantially horizontal position during use or storage of apparatus 10. Trailer 12 may also have additional stabilizer feet 21 located at or near the corners of bed 14. When placed in a lowered position or otherwise secured to bed 14, stabilizer feet 21 provide further support to maintain the horizontal position of bed 14.

Trailer 12 also has a vertically oriented panel 22 located at the back of bed 14 and configured to support various electrical components that are needed to establish temporary electrical service. Each of the electrical components of apparatus 10 is either secured to bed 14 or to panel 22.

In order to provide temporary electrical service, apparatus 10 has a first service line 100, including at least three wires 102a, 102b, 102c for connection to an overhead power supply and a second service line 110, including at least three wires 112a, 112b, 112c for connection to an underground power supply.

First service line 100 extends through a temporary service pole 30, a 90° joint 35 and a coupling 36 connecting pole 30 to bed 14, a first conduit 32a, a junction box 33, and a common conduit 32c to a transfer switch 34 mounted to an inner surface 24 of panel 22 so as to be located within trailer 12, over bed 14. Coupling 36, first conduit 32a, and junction box 33 are each carried by bed 14. A horizontal portion of common conduit 32c is carried by bed 14, while a vertical portion of common conduit 32c is carried by panel 22. Preferably, the entire length of first service line 100, with the exception of end 104, is enclosed and thereby protected.

As illustrated, service pole 30 is a hollow, cylindrical member having a conduit (not illustrated) within which a portion of the length of first service line 100 is enclosed. Service pole 30 is secured to bed 14 by way of joint 35, coupling 36 and conduit straps 37 that secure conduits 32a, 32b, and 32c to bed 14 and to panel 22. Joint 35 and coupling 36 have internal chambers (not illustrated) that are configured to communicate with the conduit of service pole 30 and with conduit 32a or another enclosure carried by or located within bed 14 so as to prevent exposure of any portion of the length of first service line 100 without pinching service line 100 or wearing the insulative sheaths of any of wires 102a–102c.

Joint 35 and coupling 36, which are illustrated as being located at a front corner of bed 14, facilitate pivotal movement of service pole 30 between a first, upright position and a second, lowered position, shown in phantom. For example, joint 35 and coupling 36 may be secured together by way of complementary threading. Such threading facilitates rotational movement of joint 35 relative to coupling 36 and, thus, facilitates pivotal movement of service pole 30 relative to bed 14 while keeping first service line 100 enclosed. Service pole 30 is placed and secured in the upright position so as to position end 104 of first service line 100 proximate an overhead power supply when apparatus 10 is used to provide temporary electrical service from the overhead power supply. Service pole 30 can be placed in the lowered position during storage or transport of apparatus 10, or when apparatus 10 is used to provide temporary electrical service from an underground power supply.

When placed in the upright position, service pole 30 is also supported by an upwardly extending service pole brace 42, which is depicted as being located at a front end of bed 14. Brace 42 is secured in the upright position by way of one or more support arms 38 that are each secured to brace 42 at one end and to bed 14 at the other end.

Figure 10:
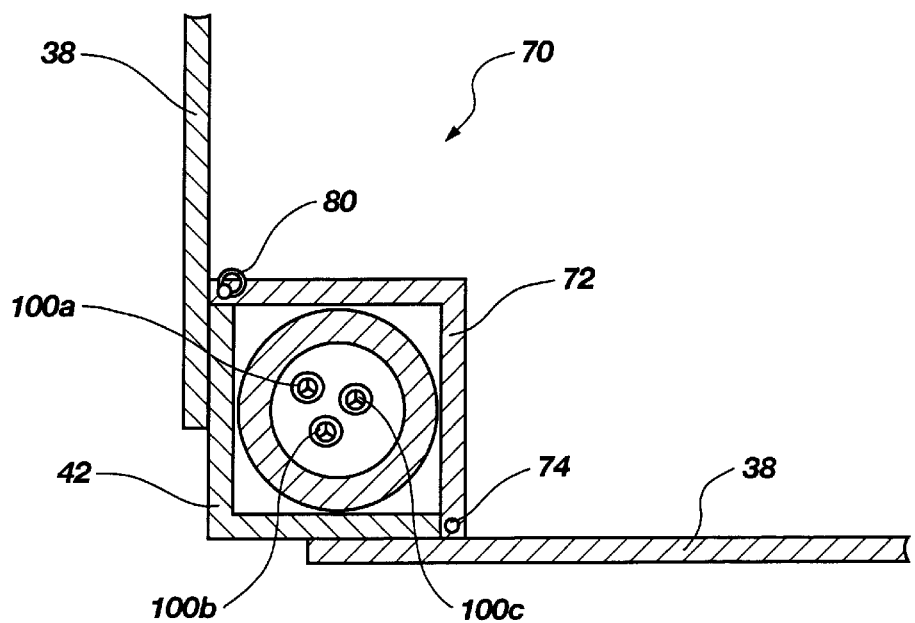
FIG. 10 is a cross-section taken along line 10—10 of FIG. 9.
Figure 9:
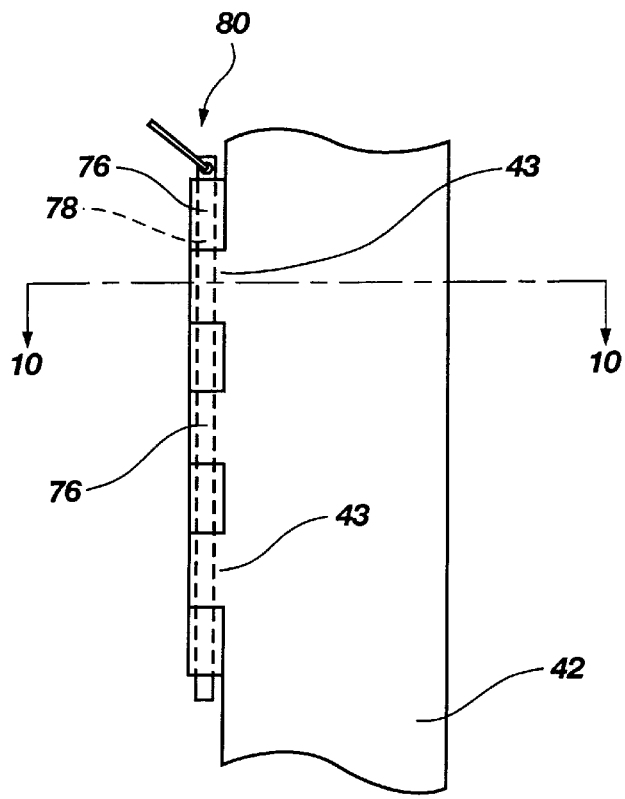
FIG. 9 is a side view of a lock for securing a service pole of the apparatus depicted in FIGS. 1–4 in an upright position.

Service pole brace 42 has an elongate receptacle 44 configured to receive at least a portion of the length of service pole 30. A lock 70 and pin 80 are positioned along brace 42 so as to secure service pole 30 in the upright position. An exemplary lock 70 and pin 80 are illustrated in FIGS. 9 and 10. Lock 70 includes a securing arm 72, which has an L-shaped cross-section taken transverse to the length thereof One edge of securing arm 72 is attached to brace 42 by way of a hinge 74. The other edge of securing arm 72 has a tongue and groove configuration, each of the tongues 76 having an elongate hole 78 formed through the length thereof, the elongate holes 78 of tongues 76 being located along a single line. When securing arm 72 is placed in a closed position, tongues 76 thereof are configured to be received between complementarily configured tongues 43 protruding from an edge of brace 42. Each of tongues 43 also has an elongate hole 78 formed through the length thereof, the elongate holes 78 of both tongues 76 and of tongues 43 being substantially in-line when securing arm 72 is placed in the closed position. Accordingly, a pin 80, such as a cotter pin, may be inserted into holes 78 to secure arm 72 in the closed position and, thus, to secure service pole 30 in the upright position.

When service pole 30 is placed in the lowered position, service pole 30 is received by and rests in a cradle 46 disposed on the top of panel 22. As illustrated, a pin 47, such as a cotter pin, may be placed through holes (not shown) formed through opposite arms of cradle 46 and over a service pole 30 resting therein so as to secure service pole 30 in the lowered position thereof.

Second service line 110 extends through a second conduit 32b, junction box 33, and cornrnon conduit 32c to transfer switch 34. Second conduit 32b, which is carried by bed 14, has a downwardly extending end 31 from which end 114 of second service line 110 extends. End 31 of second conduit 32b positions end 114 of second service line 110 near the ground. With the exception of end 114, the entire length of second service line 110 is preferably enclosed and thereby protected.

Figure 4:
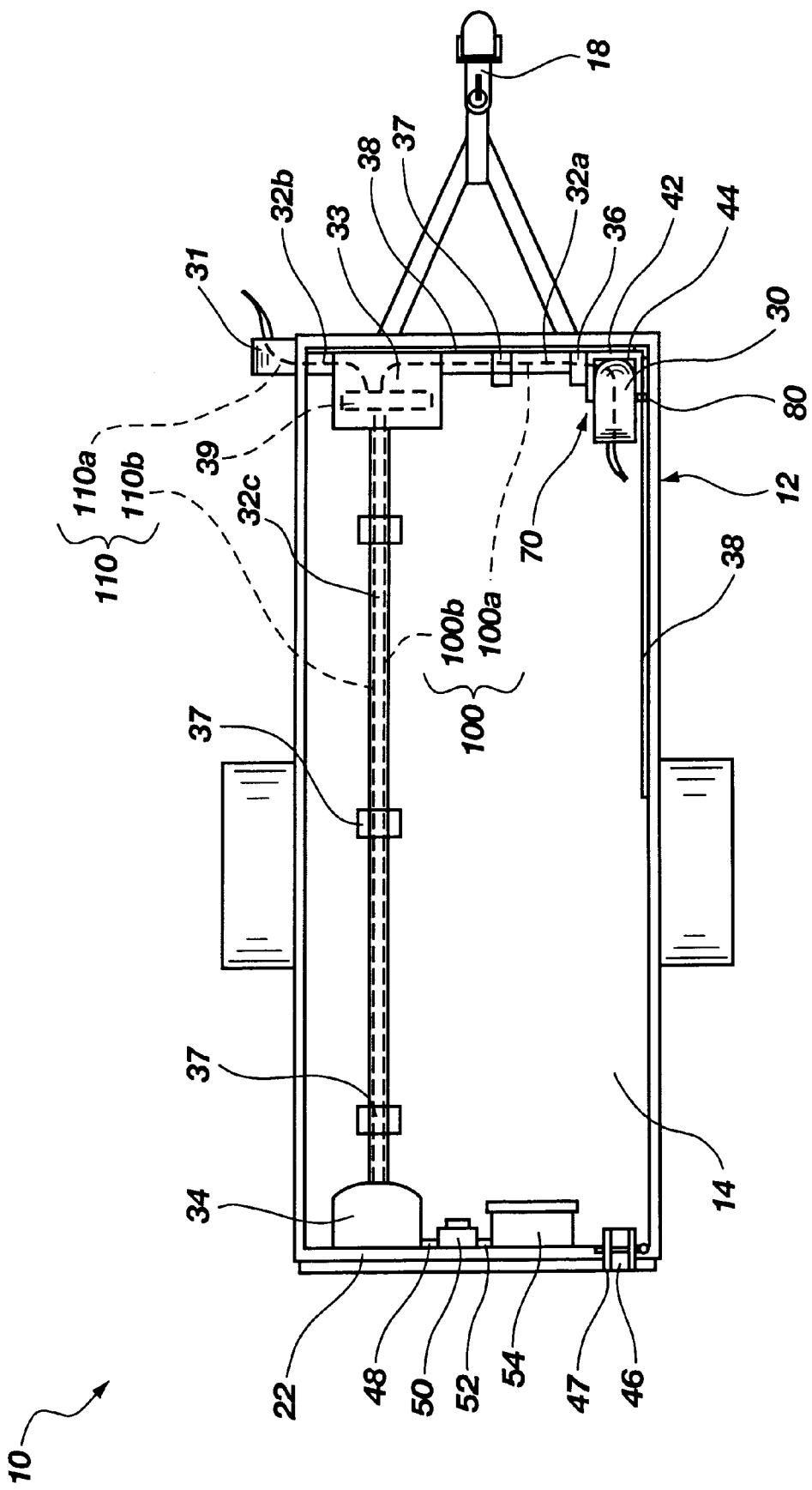
FIG. 4 is a top view of the apparatus depicted in FIG. 1.

Once a temporary electrical connection is no longer needed, first or second service line 100, 110 is typically cut and, therefore, shortened. Eventually, one or both of first and second service lines 100, 110 become too short to provide the desired temporary electrical connection and must, therefore, be replaced with longer lines. Accordingly, as shown in FIG. 4, first and second service lines 100, 110 may each have two sections, a temporary section 100a, 110a that connects to an external power supply and a permanent section 100b, 110b that extends between junction box 33 and the next electrical component of apparatus 10 (e.g., transfer switch 34 or meter base 50). The two sections 100a and 100b, 10a and 10b of each of first and second service lines 100, 110, respectively, are connected by way of electrical terminals 39 of a known type located within junction box 33. Terminals 39 eliminate the need to completely re-thread new service lines 100, 110 through their respective conduits to the first electrical component of apparatus 10 (e.g., transfer switch 34 or meter base 50) for connection therewith. When apparatus 10 includes a terminal 39 injunction box 33, new sections 10a, 110a of service lines 100, 110 need only be threaded through a portion of their respective conduits into junction box 33, where the new sections are connected to terminals 39 and, thus, to their corresponding permanent sections 100b, 110b.

Figure 6:
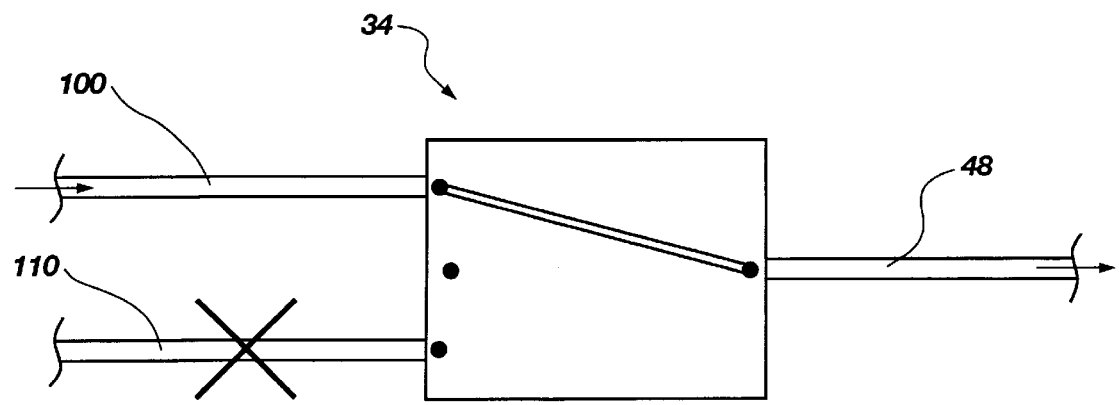
FIG. 6 is a schematic representation of the flow of power through the apparatus of the present invention with a transfer switch thereof in a first "on" position.
Figure 7:
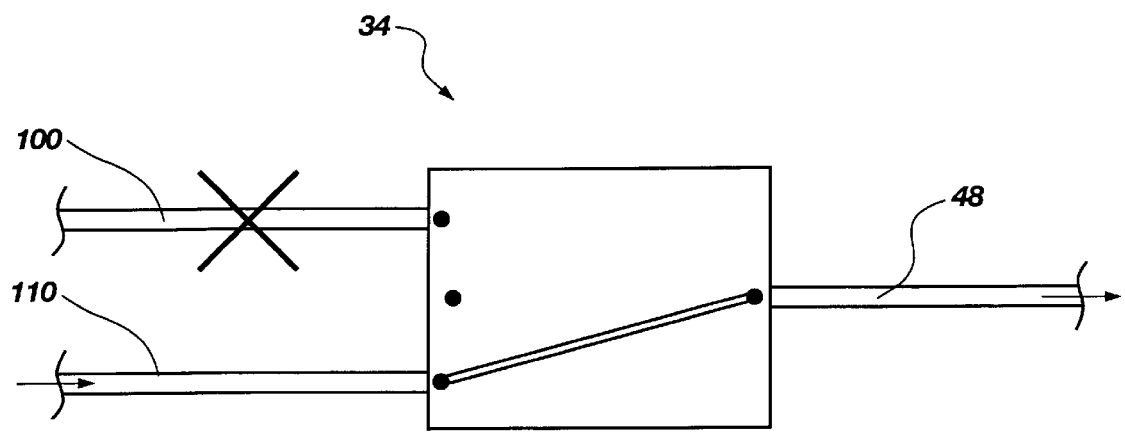
FIG. 7 is a schematic representation of the flow of power through the apparatus of the present invention with a transfer switch thereof in a second "on" position.
Figure 8:
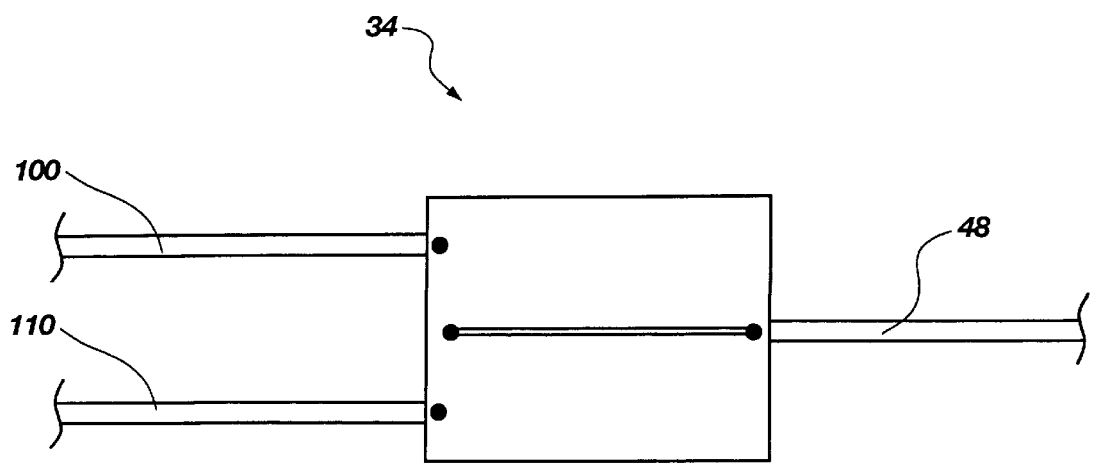
FIG. 8 is a schematic representation of the transfer switch of the apparatus of the present invention in an "off" position.

As schematically depicted in FIGS. 6–8, transfer switch 34 has three positions, two "on" positions, illustrated in FIGS. 6 and 7, and an "off" position depicted in FIG. 8. For example, the double throw safety switch marketed by Square D of Palatine, Ill. as catalog numbers 82343 and 82363, which can be used with alternating current (AC) power supplies having voltages of up to 600V, may be used as transfer switch 34.

With reference to FIGS. 6 and 7, the two "on" positions of transfer switch 34 permit power from only one of first service line 100 and second service line 110 to pass therethrough, while keeping first and second service lines 100 and 110, respectively, electrically isolated from each other. Accordingly, if one of first and second service lines 100, 110 is connected to a power supply, power will not flow from the connected service line into the unconnected service line. A double throw safety switch of a type known in the art may be used as transfer switch 34.

When transfer switch 34 is in the "off" position, as is schematically depicted in FIG. 8, electricity from both first service line 100 and second service line 110 is prevented from passing therethrough. First and second service lines 100, 110 remain electrically isolated from one another when transfer switch 34 is in the "off" position.

Turning back to FIG. 2, power flows from transfer switch 34 through wires (not shown), also referred to herein as a transfer line, disposed within a conduit 48 to a meter base 50. Conduit 48 and meter base 50 are carried by panel 22. A meter base 50 that is useful in apparatus 10 can be any type of meter base known in the art to be designed for use with the particular power supply from which temporary service is to be provided by apparatus 10. Exemplary meter bases that can be used in apparatus 10 are available from Milbank Manufacturing Company of Kansas City, Mo. When temporary service is being provided from 120/240V (i.e., residential) power lines, meter base 50 is preferably rated for about 125–150 A.

Power then flows through another set of wires disposed within another conduit 52 to a breaker box 54. Conduit 52 and breaker box 54 are also carried by panel 22. Breakers (not shown) that are useful in breaker box 54 can also be any type of breakers known in the art. For example, the breakers and breaker box that are available from Square D may be used in apparatus 10. Again, the breakers should be rated for use with the particular power supply from which temporary service is to be provided by apparatus 10 (i.e., 120/240V or 480V).

Figure 3:
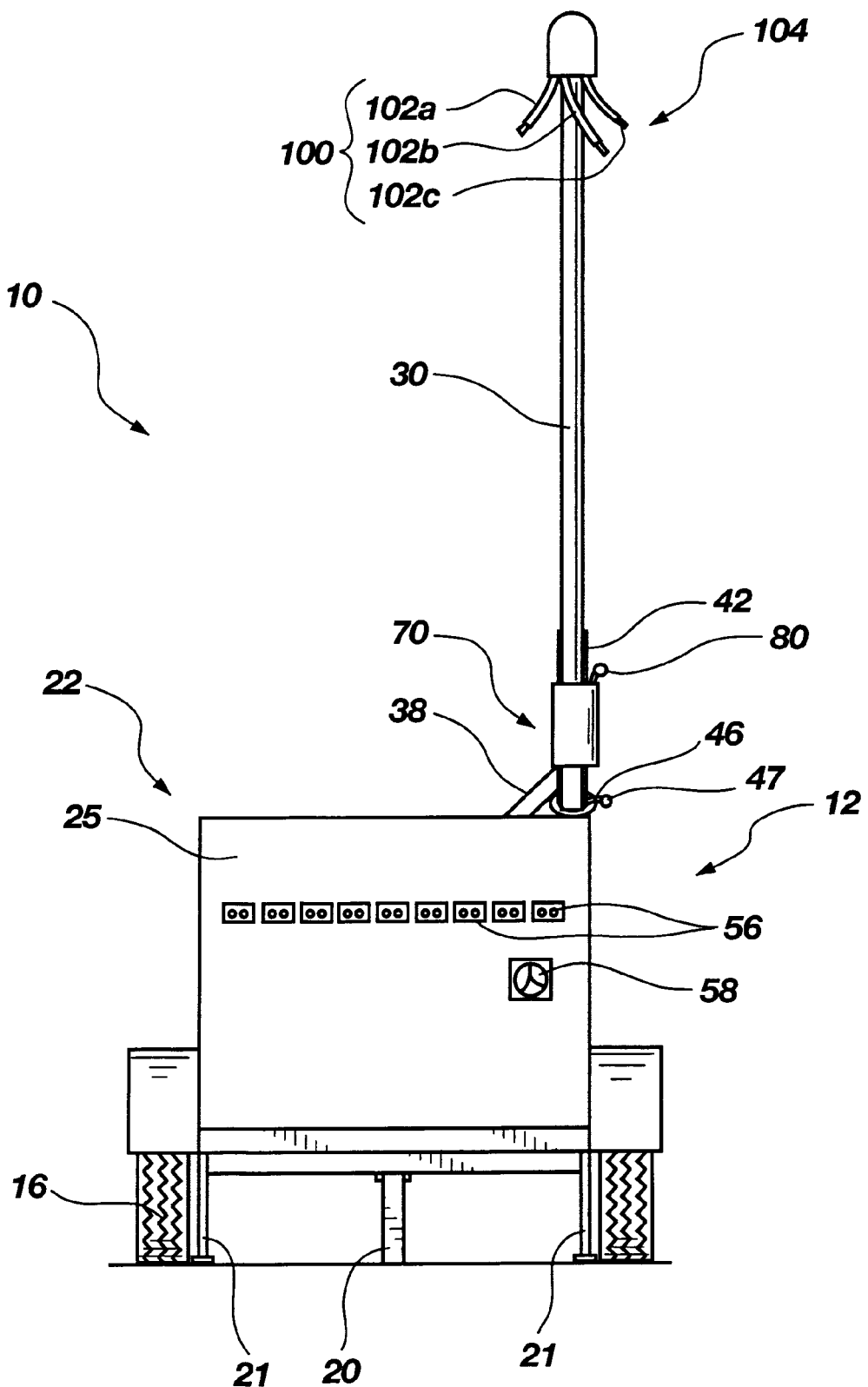
FIG. 3 is a rear view of the apparatus depicted in FIG. 1.

Referring now specifically to FIG. 3, wires disposed within panel 22 connect the breakers of breaker box 54 to electrical receptacles 56, 58 mounted on the back surface 25 of panel 22. Receptacles 56 are GFC1 protected electrical receptacles of a type known in the art, through which power having a voltage of 120Vac is supplied. Receptacle 58 is preferably a 240V electrical receptacle, also of a type known in the art.

Figure 5:
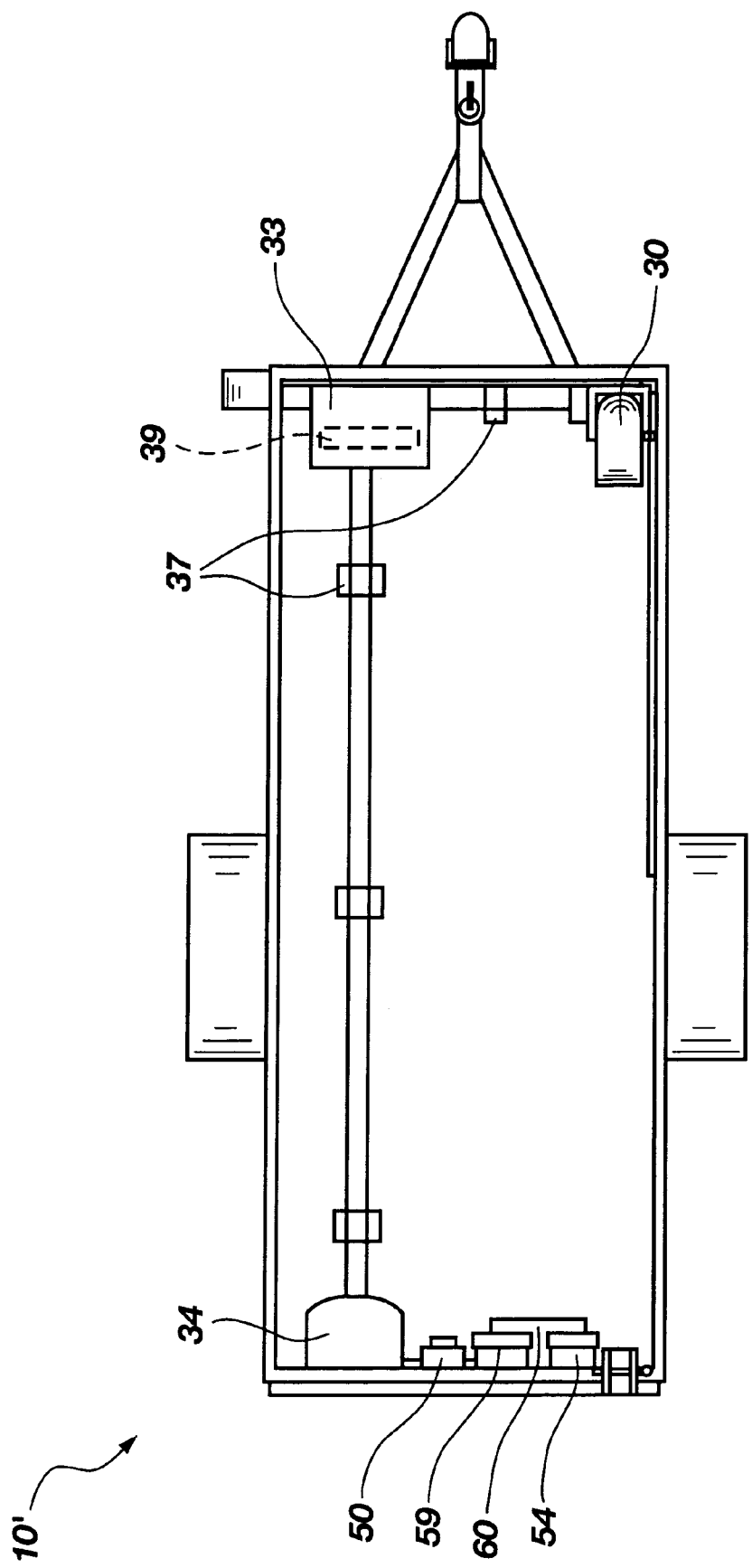
FIG. 5 is a top view of another apparatus according to the present invention.
Figure 5A:
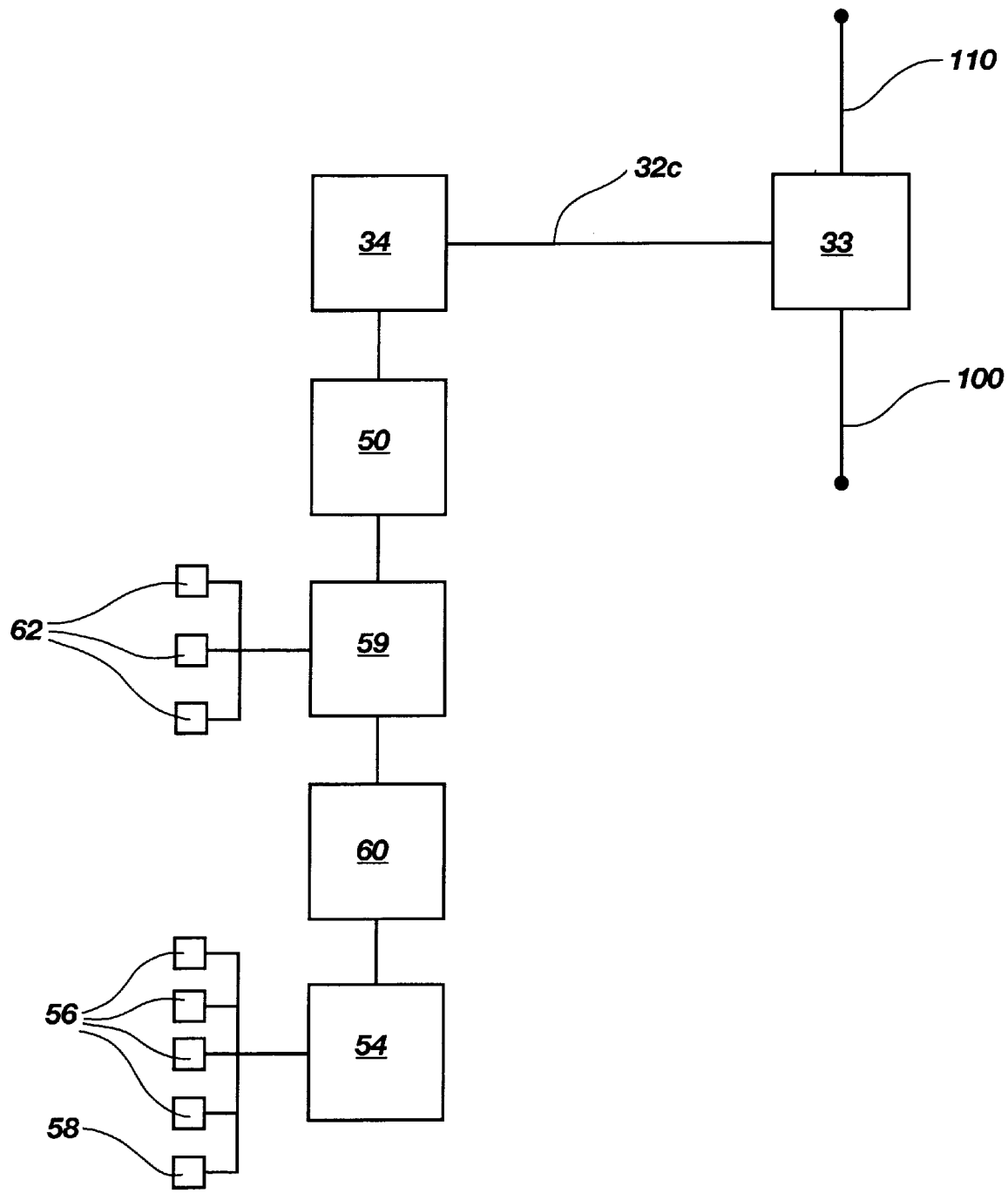
FIG. 5A is a schematic representation of the connection of the electrical components of the apparatus depicted in FIG. 5.

FIGS. 5 and 5A illustrate another embodiment of an apparatus 10' incorporating teachings of the present invention. Apparatus 10', which includes another breaker box 59 and a transformer 60 that are connected between meter base 50 and breaker box 54, is configured to provide temporary electrical service from a 480V power supply. Apparatus 10' may also include 480V electrical receptacles 62 associated with breaker box 59. Accordingly, meter base 50 is rated for a much higher current (e.g., about 208–240 A) than the minimum 125–150 A rating required in apparatus 10. Similarly, breaker box 59 is rated for a much higher current (e.g., about 208–240 A) than breaker box 54. Transformer 60, which is of a type known and used in the art, transforms the high voltage and current supplied by the power lines to a voltage (e.g., 120/240V) and current that can be used to operate electrical equipment, such as the equipment used at a construction site. The transformed electricity is then supplied to breaker box 54 and to the 120V and 240V electrical receptacles 56, 58, respectively, associated therewith.

Figure 2:
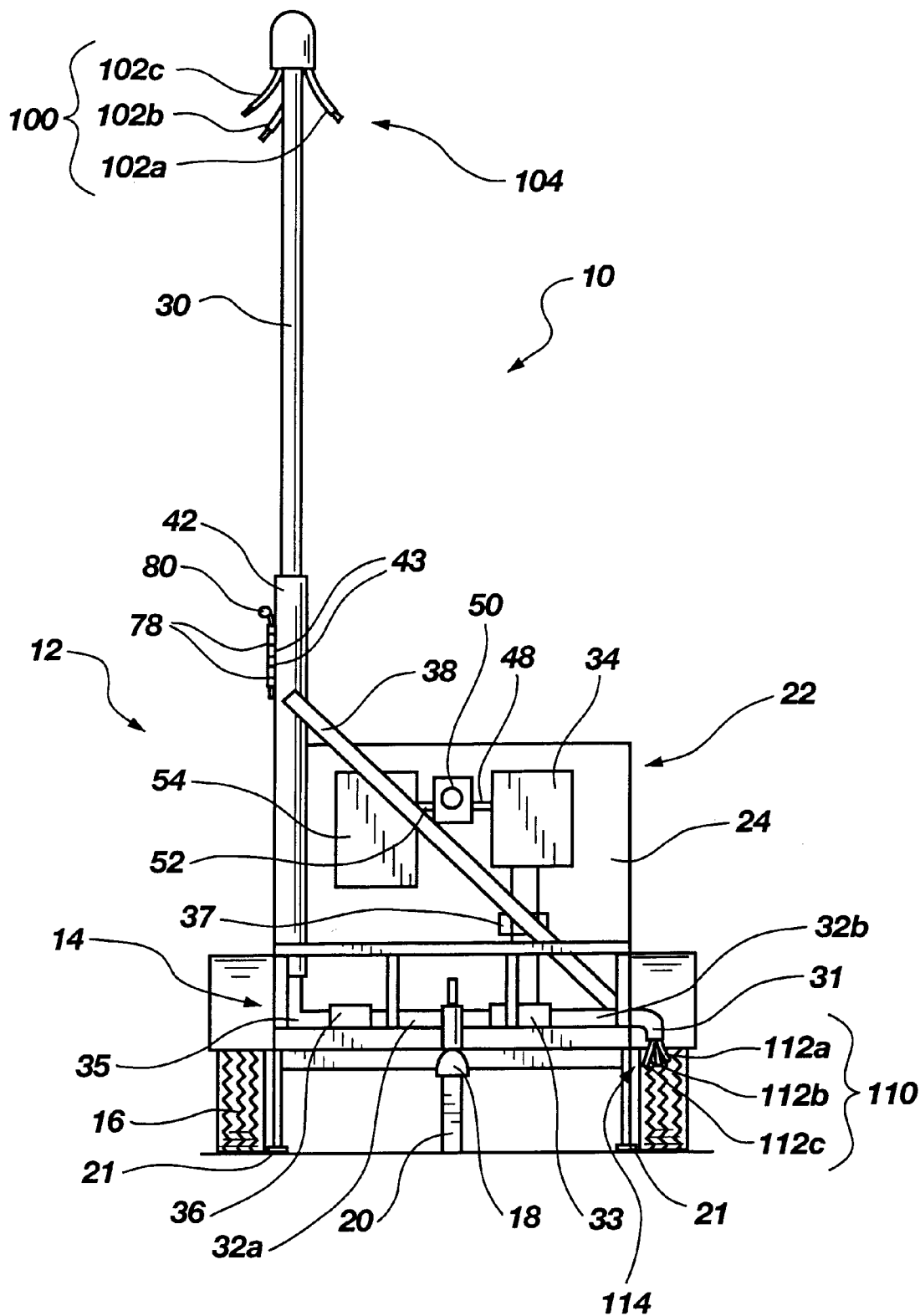
FIG. 2 is a front view of the apparatus depicted in FIG. 1.

In use, apparatus 10, 10' is transported to a site where temporary electrical service is needed. Trailer 12 is disconnected from a transporting vehicle and trailer support 20 lowered to stabilize bed 14 in a substantially horizontal position. Preferably, trailer 12 is secured in a stationary position, such as by placing blocks under wheels 16 to prevent movement of trailer 12 or by lower stabilizer feet 21. If the site is supplied with power by way of overhead power lines, temporary service pole 30 is placed and secured in the upright position, as illustrated in FIGS. 1–3, and first service line 100 connected to the overhead power supply. If the site is supplied with power by way of underground power lines, temporary service pole 30 is left in its lowered position, shown in phantom in FIG. 1, and second service line 110 is connected to the underground power supply. If apparatus 10, 10' has a transfer switch 34, transfer switch 34 is positioned so as to permit electricity to flow into meter base 50, breaker box 54, and electrical receptacles 56, 58.

When temporary electrical service is no longer needed, service line 100, 110 is disconnected from the power supply and, if temporary service pole 30 is secured in the upright position, temporary service pole 30 is lowered so as to rest in cradle 46. Apparatus 10, 10' can then be transported to storage or to another site for reuse.

While the present invention has been disclosed in terms of certain preferred embodiments, those of ordinary skill in the art will recognize and appreciate that the invention is not so limited. Additions, deletions and modifications to the disclosed embodiments may be effected without departing from the scope of the invention as claimed herein. Similarly, features from one embodiment may be combined with those of another while remaining within the scope of the invention.

What is claimed is:

1. An apparatus for providing temporary electrical service, comprising:
   a support structure;
   a service line configured to be connected to a permanent power supply, at least a portion of a length of said service line located within an enclosure of said support structure;
   another service line configured to be connected to an underground power supply, at least a portion of a length of said another service line located within an enclosure of said support structure;
   a meter base secured to said support structure and in electrical communication with at least one of said service lines; and
   at least one wheel secured to said support structure so as to facilitate transportation of the apparatus.

2. The apparatus of claim 1, wherein said support structure comprises a trailer.

3. The apparatus of claim 1, further comprising a service pole, said service pole being configured to be positionable in an upwardly extending position relative to said support structure, said service line extending through said service pole and configured to be connected to an overhead power supply.

4. The apparatus of claim 1, further comprising a transfer switch electrically disposed between said service lines and said meter base.

5. The apparatus of claim 4, wherein said transfer switch is configured to permit power from only one of said service lines to flow to said meter base.

6. The apparatus of claim 4, wherein said service line and said another service line are electrically isolated from one another.

7. The apparatus of claim 1, further comprising a transformer disposed electrically between said meter base and said breaker box.

8. The apparatus of claim 1, further comprising electrical receptacles in communication with one or more breakers of said breaker box.

9. An apparatus for providing temporary electrical service, comprising:
   a support structure;
   a service pole secured to said support structure and configured to extend upwardly therefrom;
   a first service line connectable to an overhead power supply, said first service line having: a first portion extending through said service pole;
   a first end exposed proximate a top end of said service pole;
   a second portion located within an enclosure of said support structure; and
   a second end;
   a second service line connectable to an underground power supply, at least a portion of said second service line being located within another enclosure of said support structure, said second service line having an exposed, first end and a second end;
   a transfer switch to which said second ends of said first and second service lines are connected, said transfer switch having:
   a transfer line; and
   a switch having:
   a first position for transferring power from said first service line to said transfer line; and
   a second position for transferring power from said second service line to said transfer line;
   a meter base secured to said support structure and in permanent electrical communication with said transfer switch by way of said transfer line; and
   a breaker box secured to said support structure and in permanent electrical communication with said meter base.

10. The apparatus of claim 9, further comprising at least one wheel secured to said support structure so as to facilitate transportation of the apparatus.

11. The apparatus of claim 10, wherein said support structure comprises a trailer.

12. The apparatus of claim 9, further comprising electrical receptacles in communication with one or more breakers of said breaker box.

13. The apparatus of claim 9, wherein at least one of said first and second service lines includes a temporary section and a permanent section, corresponding wires of said temporary section and of said permanent section being connected by way of electrical terminals.

14. A method for providing temporary electrical service at a site, comprising:
   providing a support structure carrying a plurality of service lines and a meter base in communication with said at least one service line; and
   connecting said at least one service line to a power supply.

15. The method of claim 14, wherein said providing said support structure comprises transporting a trailer to the site.

16. The method of claim 15, further comprising stabilizing said trailer in a stationary position.

17. The method of claim 14, wherein said providing said support structure comprising providing a support structure carrying a temporary service pole through which said at least one service line at least partially extends and wherein said connecting comprises securing said temporary service pole to said support structure in an upwardly extending orientation and connecting said at least one service line to an overhead power supply.

18. The method of claim 14, wherein said support structure also carries a transfer switch electrically disposed between said plurality of service lines and said meter base.

19. The method of claim 18, wherein said connecting comprises connecting one service line of said plurality of service lines to a power supply and further comprising orienting said transfer switch to permit power to flow from said one service line, through said transfer switch, and to said meter base.

20. An apparatus for providing temporary electrical service, comprising:
   a support structure;
   a plurality of service lines configured to be connected to a permanent power supply, at least a portion of a length of each service line located within an enclosure of said support structure; and
   at least one wheel secured to said support structure so as to facilitate transportation of the apparatus.

21. The apparatus of claim 20, further comprising a meter base in communication with at least one service line of said plurality of service lines.

22. The apparatus of claim 20, further comprising a transfer switch in communication with each of said plurality of service lines.

23. The apparatus of claim 20, wherein a first service line of said plurality of service lines is configured to be connected with an overhead power supply and a second service line of said plurality of service lines is configured to be connected with an underground power supply.

* * * * *

UNITED STATES PATENT AND TRADEMARK OFFICE
CERTIFICATE OF CORRECTION

PATENT NO.    : 6,252,764 B1  
DATED         : June 26, 2001  
INVENTOR(S)   : Robert Karl Benson It is certified that error appears in the above-identified patent and that said Letters Patent is hereby corrected as shown below:

Drawings,
FIG. 10, change "100a" to -- 102a --, change "100b" to -- 102b -- and change "100c" to -- 102c -- as shown below:
--

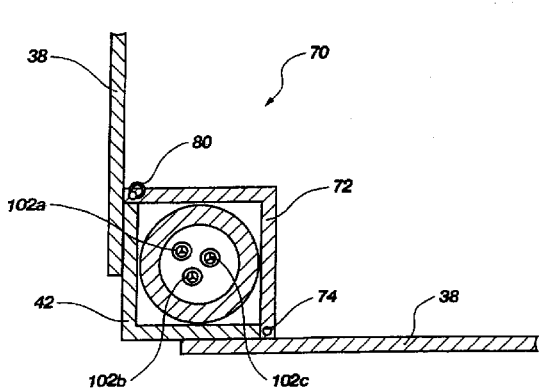

Fig. 10

--

Column 1,
Line 32, after "thereof" insert -- . --

Column 5,
Line 18, after "thereof" insert -- . --
Line 62, change "10a" and 10b" to -- 110a and 110b --

Column 6,
Line 4, change "10a" to -- 100a --

Signed and Sealed this

Eighth Day of July, 2003

JAMES E. ROGAN  
*Director of the United States Patent and Trademark Office*